W. A. STELLMACHER.
PANTOGRAPH BALANCING MECHANISM FOR EMBROIDERING MACHINES.
APPLICATION FILED JUNE 11, 1912.
1,068,284.
Patented July 22, 1913.
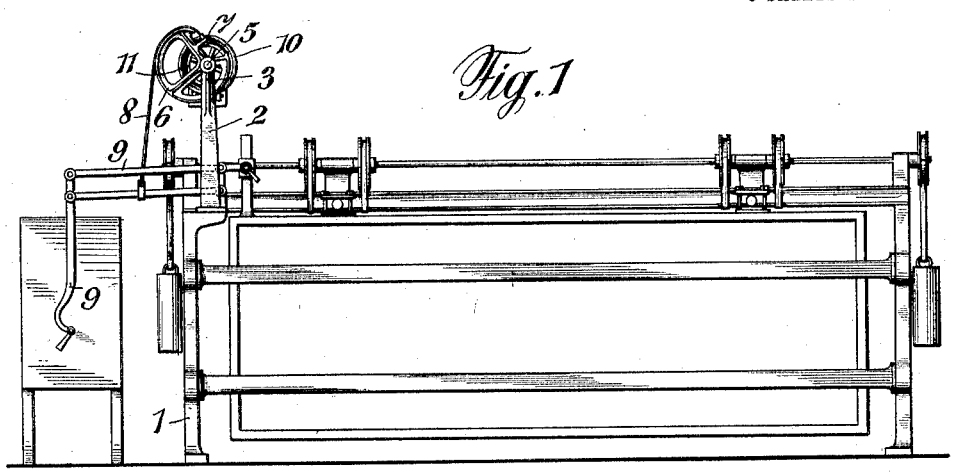
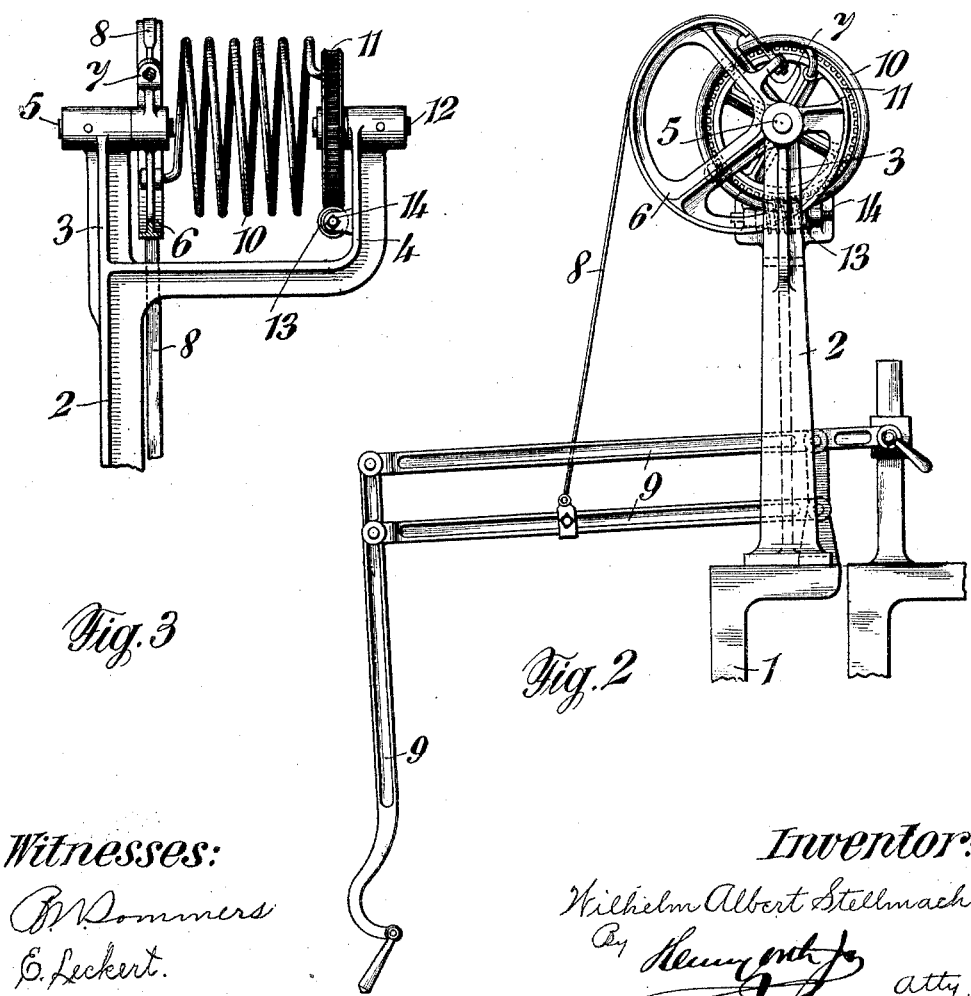
Witnesses:
B. Sommers
E. Leckert.
Inventor:
Wilhelm Albert Stellmacher
By Henry Orth Jr.
atty.

W. A. STELLMACHER.
PANTOGRAPH BALANCING MECHANISM FOR EMBROIDERING MACHINES.
APPLICATION FILED JUNE 11, 1912.
1,068,284.
Patented July 22, 1913.
3 SHEETS—SHEET 2.
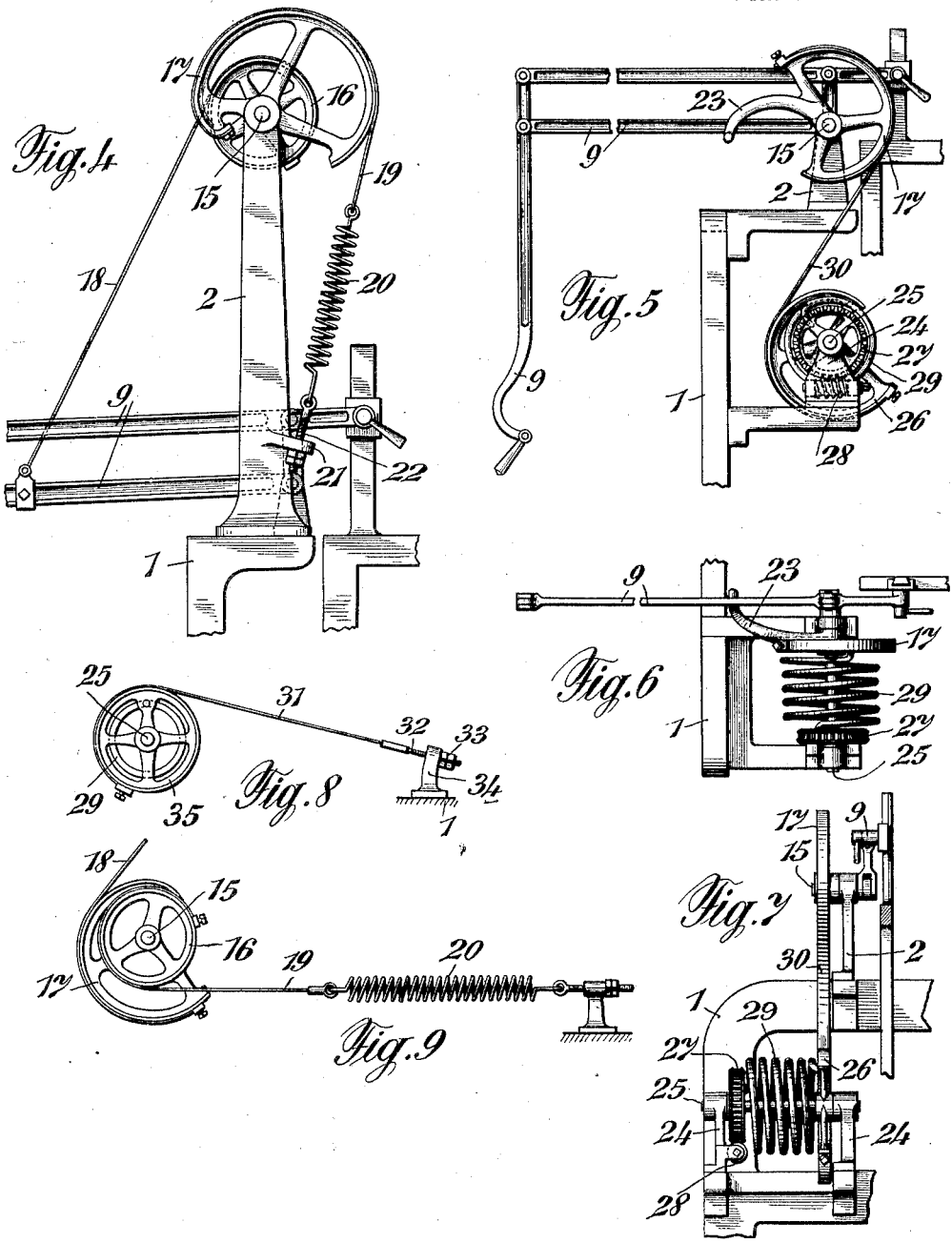
Witnesses:
B. Dommers
E. Leckert.
Inventor:
Wilhelm Albert Stellmacher
By Henry Orth Atty W. A. STELLMACHER.
PANTOGRAPH BALANCING MECHANISM FOR EMBROIDERING MACHINES.
APPLICATION FILED JUNE 11, 1912.

1,068,284.

Patented July 22, 1913.

3 SHEETS—SHEET 3.

Witnesses:
B. Dommers
E. Deckert

Inventor:
Wilhelm Albert Stellmacher
By Henry Orth
Atty.

UNITED STATES PATENT OFFICE.

WILHELM ALBERT STELLMACHER, OF ARBON, SWITZERLAND.

PANTOGRAPH-BALANCING MECHANISM FOR EMBROIDERING-MACHINES.

1,068,284.  Specification of Letters Patent.  Patented July 22, 1913.

Application filed June 11, 1912. Serial No. 703,049.

*To all whom it may concern:*

Be it known that I, WILHELM ALBERT STELLMACHER, a citizen of the Republic of Switzerland, residing at Arbon, Switzerland, have invented certain new and useful Improvements in Pantograph - Balancing Mechanism for Embroidering Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my present invention is a mechanism for balancing pantographs of embroidery machines by the force of a spring, in which there is provided at least one curved disk acted on by the spring, which disk transmits the action of the spring to the pantograph and is so formed, that at the movement of the pantograph the radius of the curved disk, which at any time acts as a lever transmitting the force of the spring to the pantograph, is altered in order to balance the action of the weight of the pantograph at every position of the latter.

Preferably two disks or snail-like cams are used, one of which, by its varying leverage, compensates the variation of pressure exerted by the spring, and the other of which compensates the variable effective leverage of the pantograph.

In the accompanying drawing several constructions according to my present invention are illustrated by way of example.

Figure 10:
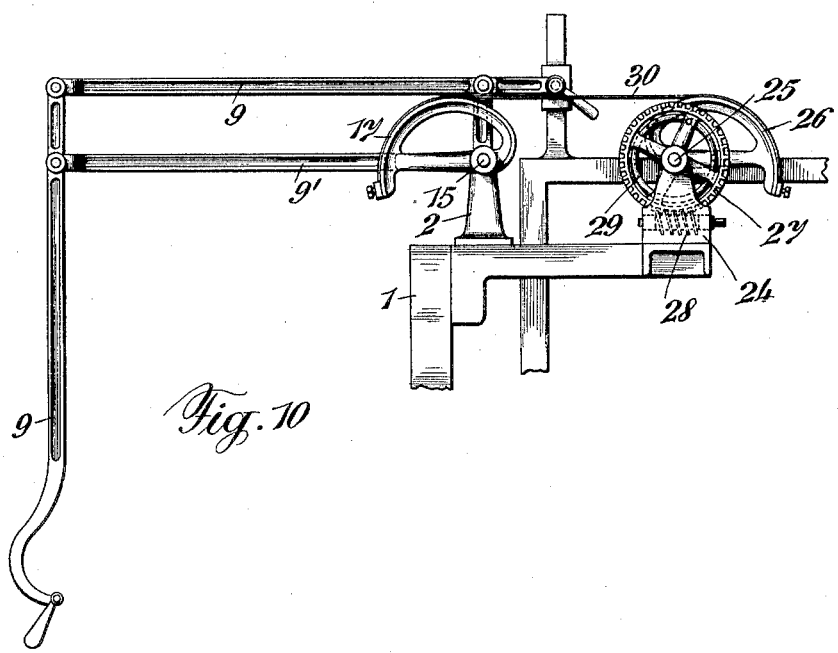
Figure 11:
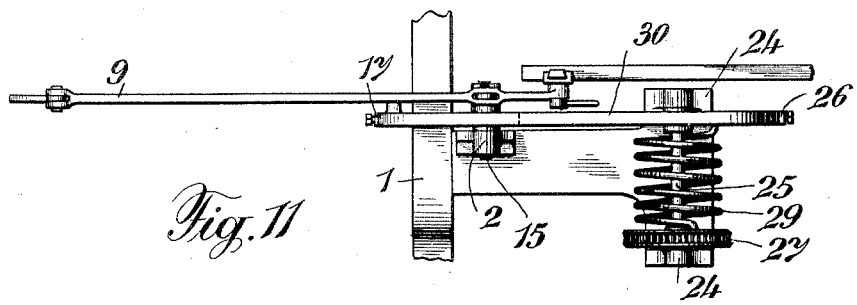
Figure 12:
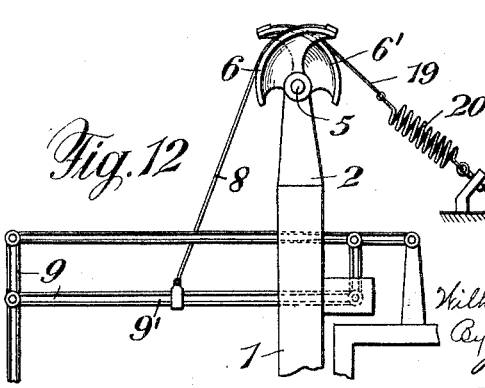

Figure 1 is a side elevation which shows an embroidery machine carrying a mechanism for balancing the pantograph. Fig. 2 is a side elevation, showing the balancing mechanism on a larger scale. Fig. 3 is a front elevation of the same. Fig. 4 illustrates a second form of construction. Figs. 5 to 7 show different views of a third form of construction. Figs. 8 and 9 show variations of details of the second and third form of construction. Figs. 10 and 11 show different views of a further form of construction. Fig. 12 illustrates a last form of construction.

Referring firstly to Figs. 1 to 3, 1 designates the frame of the embroidery machine on the top of which is mounted a support 2 having upward projecting arms 3 and 4. An axle 5 secured to the arm 3 pivotally carries a curved disk 6. A band 8 is guided on the surface of the latter and secured to it at 7. The other end of the band is secured to a member of the pantograph 9 of the embroidery machine. A helical torsion spring 10 is secured by its one end to the curved disk 6 and by its other end to a worm wheel 11. The worm wheel is mounted to turn about an axle 12, which is secured to the arm 4 located co-axially with the axle 5. The worm wheel 11 meshes with a worm 13 mounted on the arm 4, which worm can be turned by means of a square 14 provided on its axle.

The curved disk 6 is so formed, that when the pantograph is raised or lowered the radii of the disk are altered so with regard to the alteration of the tension of spring 10, that at every position of the pantograph the action of its weight is balanced. By means of the worm gear 11, 13 the tension of the spring may be adjusted.

In the second form of construction (Fig. 4) a concentric disk 16 to which is secured a curved disk 17 is mounted to turn about an axle 15 secured to the support 2. A band 18 guided on the surface of the disk 16 is secured by one end to the latter and by the other end to a member of the pantograph 9. A band 19 guided on the surface of the disk 17 is secured by one end to the latter and by the other end to a helical draw spring 20. The latter is connected to the machine frame by means of a threaded bolt 22 adjustably secured to the arm 21 projecting from the support 2.

The curve of disk 17 is formed so that the radius of the latter which at any time acts as the lever transmitting the action of the spring 20 to the pantograph 9 is altered according to the alteration of the tension of the spring so that the action of the weight of the pantograph is balanced at every position of the latter.

In the third form of construction (Figs. 5 to 7) the pantograph is mounted to turn about the axle 15. The curved disk 17 mounted on this axle is provided with an arm 23 which by its free end supports a member of the pantograph 9. Below the axle 15 a curved disk 26 is mounted on a shaft 25 which is carried by two supports 24 secured on the frame 1. The worm wheel 27 of the worm drive 27, 28 is mounted to turn free about the shaft 25. By the worm drive the tension of the spring 29 may be adjusted. The helical spring 29 arranged between the worm wheel 27 and the curved disk 26 is secured by one end to the worm wheel and by the other end to the curved disk. A drawing member 30 passing over the surfaces of the curved disks 17 and 26 is secured by its ends to the disks.

The curves of the disks 17 and 26 are formed so that when the height of the pantograph is changed the radii of one of the curves increase while the radii of the other curve decrease in such a manner, that when the pantograph is moving downward the angular motion of the curved disk 26 secured to the helical spring 29 is retarded with regard to the angular motion of the curved disk connected to the pantograph, which retardation in connection with the alteration of the radii balances the action of the weight of the pantograph in all its positions.

In the form of construction according to Fig. 8 the worm gear for stretching the helical spring 29 is replaced by a drawing member 31 passing over the surface of a concentric disk 35 mounted to turn free about the shaft 25. The drawing member, which is secured by its one end to the disk 35 and by its other end to a threaded bolt 32 passing through a projection 34 of the frame 1, can be adjusted by means of nuts 33.

The form of construction shown in Fig. 9 is distinguished from Fig. 4, in that the spring 20 and drawing member 19 act on the disk 16 instead of on the cam-shaped member 17, as in Fig. 4, and the drawing member 18 has one end connected to a pantograph element and its opposite end connected to the curved disk 17, instead of to the disk 16, as in Fig. 4.

In the form of construction according to Figs. 10 and 11 the axle 15 is free to turn in the support 2. The curved disk 17 and a member 9' of the pantograph 9 are secured to the axle. In this form of construction the axle 15 and the shaft 25 are mounted on the same level. The form of the curves of disks 17 and 26 is so, that the same effect is produced as in the form of construction according to Figs. 5 to 7.

In the form of construction shown in Fig. 12 curved disks 6 and 6' are secured on the axle 5 which is pivotally mounted in the support 2. The disk 6 is connected by a drawing member 8 to the member 9' of the pantograph, while the disk 6' is connected by the drawing member 19 to the spring 20.

I claim:

1. In mechanism for spring balancing the pantographs of embroidery machines, the combination with the pantograph, of a spring, and means for supporting the pantograph and acted upon by the spring to compensate for the varying strength of the spring for all different positions of the pantograph and for also compensating for the variation of the effective lever arm of the pantograph for all the various positions of the latter whereby the power required to move the pantograph remains the same under all conditions of operation.

2. In mechanism for spring balancing the pantographs of embroidery machines, the combination with the pantograph; of a spring, means connected to the spring to equalize its action for various positions of the pantograph, and means connected to the aforesaid means and acting on the pantograph to equalize the effective leverage of the pantograph.

3. In mechanism for spring balancing the pantograph of embroidery machines, the combination with the pantograph; of a curved disk for supporting the pantograph whose effective lever arm varies in accordance with the variations of the effective leverage of the pantograph, a second curved disk, a flexible connection between the two curved disks, a spring acting on the second curved disk, the effective lever arm of said second curved disk varying to compensate the variation of the strength of the spring for the different positions of the pantograph.

4. In mechanism for spring balancing the pantographs of embroidering machines, the combination with the pantograph; of a curved disk having an arm engaging the pantograph, a second curved disk, a flexible connection between the curved disks, and a spring acting on the second curved disk.

5. In mechanism for spring-balancing the pantographs of embroidering machines, the combination with the pantograph; of a curved disk connected to the pantograph whose effective leverage compensates the variation of leverage of the pantograph, a second curved disk, a torsion spring connected to the second disk, said second disk connected to the first disk for compensating the variation of the spring for different positions of the pantograph, and means to adjust the tension of said spring.

6. In mechanism for spring-balancing the pantograph of embroidering machines; the combination with the pantograph; of a curved disk for supporting the pantograph, a second curved disk, a flexible connection between the disks, a worm wheel, a torsion spring between said wheel and second disk and a worm for turning the wheel.

7. In mechanism for spring-balancing the pantograph of embroidery machines, the combination with the pantograph and its pivot; of a curved disk on said pivot and having a lateral projection on which the pantograph rests, a second curved disk whose axis is substantially in a horizontal plane with said pivot, a flexible connection between the disks, and a torsion spring connected to the second disk.

In testimony that I claim the foregoing as my invention, I have signed my name in presence of two subscribing witnesses.

WILHELM ALBERT STELLMACHER.

Witnesses:
R. SIGRIST,
EUGENE NABELN.

Copies of this patent may be obtained for five cents each, by addressing the "Commissioner of Patents. Washington, D. C."